United States Patent [19]

Brown

[11] 4,359,530

[45] Nov. 16, 1982

[54] PROTEIN EXTRACTION FROM GREEN CROPS

[75] Inventor: Melvin H. Brown, Freeport, Pa.

[73] Assignee: Aluminum Company of America, Pittsburgh, Pa.

[21] Appl. No.: 185,177

[22] Filed: Sep. 8, 1980

[51] Int. Cl.³ .................. C12P 21/00; C07G 7/00; A23J 1/00; A23B 4/12

[52] U.S. Cl. .................. 435/68; 435/136; 435/272; 435/801; 435/813; 426/7; 426/656; 260/112 R

[58] Field of Search ............ 435/68, 99, 105, 262, 435/267, 272, 274, 276–279, 801, 813, 136; 426/7, 48, 49, 52, 53, 54, 425, 656; 127/34, 36, 37; 162/14, 16, 97; 260/112 R

[56] References Cited

U.S. PATENT DOCUMENTS

| | | | |
|---|---|---|---|
| 2,074,441 | 3/1937 | Van Sant | 435/272 |
| 2,190,176 | 2/1940 | Smith | 99/2 |
| 2,284,700 | 6/1942 | Wahlforss | 426/425 |
| 2,559,459 | 7/1951 | Peebles et al. | 99/204 |
| 2,600,903 | 6/1952 | Miller | 99/2 |
| 2,607,688 | 8/1952 | Peebles et al. | 99/8 |
| 3,420,676 | 1/1969 | Keitel | 99/105 |
| 3,637,396 | 1/1971 | Hollo et al. | 99/9 |
| 3,684,520 | 8/1972 | Bickoff et al. | 99/8 |
| 3,775,133 | 11/1973 | Batley, Jr. | 426/378 |
| 3,823,128 | 7/1974 | Bickoff et al. | 260/112 R |
| 3,833,738 | 9/1974 | Edwards et al. | 426/52 |
| 3,959,246 | 5/1976 | Bickoff et al. | 260/112 R |
| 3,972,775 | 8/1976 | Wilke et al. | 435/813 |
| 3,975,546 | 8/1976 | Stahman | 426/49 |
| 4,006,078 | 2/1977 | Bickoff et al. | 426/425 |
| 4,237,226 | 12/1980 | Grethlein | 435/105 |
| 4,250,197 | 2/1981 | Koch | 426/52 |

FOREIGN PATENT DOCUMENTS 270629 11/1927 United Kingdom .
457789 12/1936 United Kingdom .
511525 8/1939 United Kingdom .

*Primary Examiner*—Thomas G. Wiseman
*Attorney, Agent, or Firm*—Andrew Alexander

[57] ABSTRACT

A method of extracting protein from green crops such as leaves, grasses, legumes, stems of green plants and tree leaves is disclosed. The method comprises the steps of subjecting the green crops to a pulping action in an acid solution recirculated from a subsequent anaerobic fermentation step to produce a pulp comprising a protein-rich liquid and fibrous material. The protein-rich liquid in the pulp is separated from the fibrous material. The protein is separated from the protein-rich liquid by anaerobic fermentation in an acidic solution thereby providing a concentrated protein fraction suitable for preservation and an acidic solution at least a portion of which is recycled to insure further removal of protein from the fibrous material.

4 Claims, 1 Drawing Figure

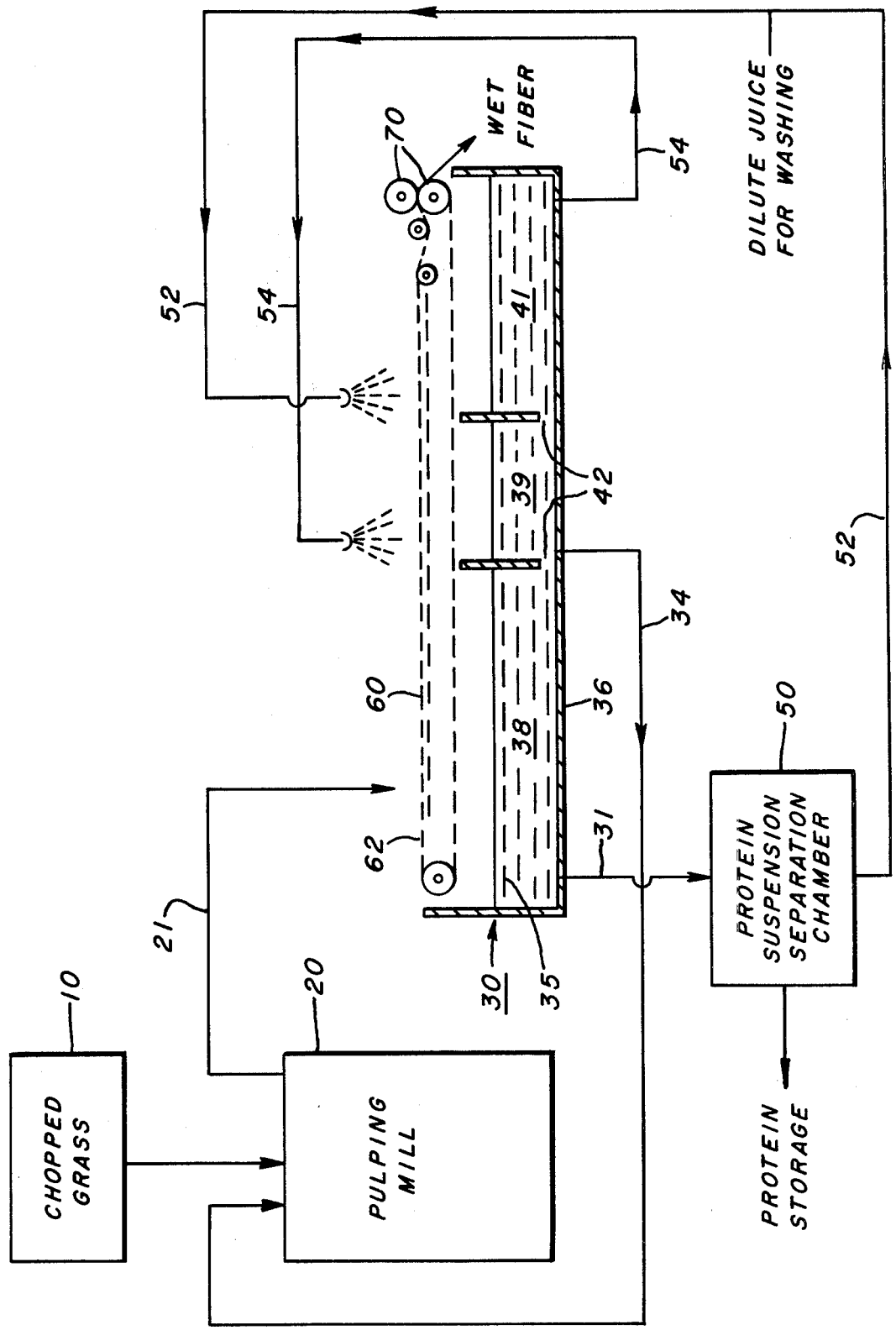

PROTEIN EXTRACTION FROM GREEN CROPS

BACKGROUND OF THE INVENTION

The present invention relates to a method for extracting protein and other valuable materials from green crops.

The present energy shortage has accelerated the search for fuel sources to supplement diminishing gas and oil supplies. Because of its abundance, vegetation is one potential energy source being seriously investigated. While trees have been an important fuel source, current efforts are directed toward more easily replenished vegetation such as green crops in feedstock such as grass, leaves and unused portions of green plants (e.g. stems). Feedstock materials could be theoretically burned, fermented or reacted chemically with other materials to release energy. The energy which could be derived from farmlands can equal that derived from all the natural gas produced in the United States. However, green crops normally would not be considered to constitute an economically desirable energy source until an economical method is devised for extracting values such as protein and glucose therefrom and the conversion of glucose to fuel values such as alcohol. Further, the cost of fossil fuel is not at a level which would make use of green crops for fuel economical. In addition, there is the need to balance the loss of foodstuffs against the necessity to generate energy to supplement diminishing fossil fuel sources. Thus, it can be seen that for purposes of economics, when using green crops it is important to consider both food and fuel values.

Perennial plants such as grass and legumes can provide a particularly economical fuel supply if the food values, such as protein and glucose, contained therein can be extracted efficiently. Additionally, perennials can flourish on land unsuitable for most crops, have a short growing season and substantially eliminate loss of topsoil due to erosion.

In view of these problems, it would be advantageous to have a method for economically extracting the food values from green crops. Further, it can be seen that it would be advantageous to provide a method of extracting food values from green crops or plants which permits recovery of the residue as a fuel source.

SUMMARY OF THE INVENTION

An object of the invention is to provide a method for extracting protein from green crops.

Another object of the invention is to provide a method for extracting protein from green crops by a pulping action which produces a protein-rich liquid.

And yet another object of the invention is to provide a method for extracting protein from green crops wherein a protein-rich liquid is produced and the protein is separated from the liquid by fermentation in an acidic solution.

These and other objects will become apparent from the drawing, specification and claims appended hereto.

In accordance with these objects, protein is extracted from green crops such as leaves, grass and stems of green plants by subjecting the green crops to a pulping action to produce a pulp comprising a protein-rich liquid and fibrous material and by separating the protein-rich liquid in the pulp from the fibrous material. The protein is separated from the protein-rich liquid by fermentation in an acidic solution thereby providing a concentrated protein fraction suitable for preservation and an acidic solution and a portion of the acidic solution is recycled, the recycling of the solution being provided to insure further removal of protein from the fibrous material.

DETAILED DESCRIPTION OF THE PREFERRED EMBODIMENTS

By reference to FIG. 1, it will be seen that crops, e.g. green crops, to be treated in accordance with the present invention are preferably subjected to a chopping action 10 prior to being fed into mill 20. In mill 20, the chopped crops are subjected to a hammering or pulping action for purposes of rupturing plant cell walls thereby providing liquid and fibrous material in the mill. For purposes of separation, liquid and fibrous material are passed via line 21 to separation chamber 30. That is, in chamber 30, the liquid in the pulp is separated from the fibrous material which is useful in the production of fuel, as explained later. After the liquid is separated from the fibrous material, it is passed via line 31 to a protein separation vessel 50. In vessel 50, the liquid which is rich in protein is fermented to effect separation of the protein from the rest of the liquid. The separated protein can be stored and protein-free liquid is recycled to separator 30 via line 52 where it has been found to be useful or beneficial in washing residual protein from the fibrous material.

Feed materials which can be used in the process of the present invention include green crops and the like such as grasses and legumes. Other materials which would be normally considered to be waste, such as stems and unused portions of green plants, corn, sugar cane, water hyacinth and the like, can also be used. Preferably, these materials are chopped or provided in a particle size which facilitates the pulping process.

It will be understood that in the pulping action, various levels of liquid can be encountered, depending to a large extent on the crop being processed. However, it is preferred to maintain the level of liquid in the crops being subjected to pulping at a controlled level. Accordingly, it has been found advantageous to recycle a portion of the liquid which has been separated from the fibrous material in chamber 30 back to mill 20. It is preferred that the liquid recirculated to mill 20 have a relatively low level of protein. Thus, such liquid must be selectively removed from separator 30 in order to avoid circulating back liquid high in protein, as will be explained later. The liquid may be recycled back along line 34 from compartment 39 of chamber 30, as shown in FIG. 1. The liquid level is maintained in the mill for purposes of aiding pulping and to increase the fluidity of the pulp in order to move it through the mill. For example, if the feed to the mill is fescue grass, a typical amount of liquid added would be about ten times the weight of the feed.

With respect to pulping, it is an important aspect of this invention that such pulping be carried out in an organic acid solution which is obtained by recirculating solution from a subsequent anaerobic fermentation step. Preferably, the solution has a pH of less than 6.0 with a pH in the range of 3.0 to 5.5 having been found to be quite suitable. Carrying out the pulping action in this acidic solution is advantageous for several reasons. First, liquid either quite low in protein content or substantially protein-free can be used and as noted above, such liquid can be recirculated from compartment 39 to mill 20. This is advantageous because liquid from separator chamber 50 can be used for pulping, which liquid is acidic by virtue of the natural anaerobic fermentation separation process used in the present invention. This, in turn, avoids dumping of the liquid from chamber 50 and also avoids environmental problems attendant thereto. Further, re-use of such liquid avoids dilution of the protein content of the liquid being separated from the fibrous material and, in fact, aids the process by further concentrating protein washed from the fibrous materials in subsequent steps. This aids the separation of protein from the liquid in chamber 50 by its having a higher level of protein and also by maintaining the acidity of the liquid sufficiently low to accelerate protein separation by fermentation. Separation in this manner is more economical since it avoids the use of heat. That is, the use of heat to accelerate the process at the pulping step or any step subsequent thereto is not desired. Further, it has been found that inoculum such as yeasts and other types of microorganism are not required to initiate fermentation in a short period when the pulping is carried out in the acid solution from previous fermentation separation steps.

With respect to pulping, it has been found that a hammermill obtainable from Western Land Roller Company, Hastings, Nebr., under the designation Bear Cat has been highly suitable.

With respect to recovering proteins in the process of the present invention, the initial step is to transfer the pulp to separator 30, FIG. 1. It will be understood that the transferring may be done on a continuous or intermittent basis. In separation chamber 30, the pulp is placed on filter screen belt 60 which permits the liquid in the pulp to drain into a container referred to generally as 36 where it can accumulate if desired, the liquid being referred to as 35 in FIG. 1. In this way, the pulp can be separated into two fractions, one of which is comprised of liquid and the other of wet fibers. Because of the nature of the pulp, it has been discovered that considerable amounts of residual liquid and protein adhere to the fibrous material remaining on the belt even after draining. Thus, in separation of the liquid in the pulp from the fibrous material in accordance with the invention, it is preferred that the separation on the filter belt be achieved so as to provide three fractions. Accordingly, container or separation chamber 30 should be separated into three parts. Thus, filter belt 60 is positioned over container 30 so that liquid highest in the level of proteins is recovered in chamber 38. This is achieved by placing or feeding pulped material initially onto end 62 of belt 60 where liquid high in protein can be separated from the fibrous material by draining. Thus, a liquid fraction having a relatively high level of protein is recovered initially. This liquid high in protein is removed via line 31 to the protein separation chamber.

Liquid and protein adhering to the fibrous material are most advantageously removed into a subsequent container, referred to as 39 in FIG. 1, by scrubbing with a liquid being either protein free or having a low level of protein. The liquid having a relatively low level of protein is recirculated from a third chamber 41 along line 54. The liquid in chamber 41 is collected wash liquid which had been recirculated along line 52 from protein separation chamber 50 and such liquid, as noted earlier, is substantially protein free but which has been found to be useful for scrubbing remaining protein from the fibrous material. That is, protein-free liquid is first used to wash the remaining protein from the fibrous material and is collected in third chamber 41. By protein-free liquid is meant liquid which is substantially free of suspended protein but which liquid may contain soluble protein, depending to some extent on the green crops being processed. It should be noted that in some cases it may be necessary to add water to the system depending on the feedstock. In such cases, the make-up water is preferably added so as to have scrub or wash liquid therefrom deposited into chamber 41 or the third chamber under belt 60. However, water should not be added to an extent which adversely affects natural pH equilibrium which is maintained by recirculating the liquid from separation chamber 50.

Rollers 70 aid in extracting or pressing residual liquid from the fibrous material and any protein contained therein. The level of protein in the liquid in chamber 41 is increased by recirculating said liquid along line 54 to the initial scrub step where the liquid from such scrubbing is collected in chamber 39. Thus, it will be seen that in the process of the present invention, the separation of liquid and protein from the fibrous material is carried out in three steps for purposes of greatest efficiency. It will be noted that openings 42 may be provided to equalize the liquid level in the three collection compartments without adversely affecting the efficiency of the process.

For purposes of further concentrating the protein, liquid from chamber 39 is circulated to mill 20 for use in pulping green crops. The result of these steps is to provide a liquid with a significantly high level of protein which is then collected in chamber 38 and which is more economically separated from the liquid in chamber 50.

As well as concentrating the protein for purposes of separation, the steps of the present invention are advantageous in that they significantly reduce the time required to separate the protein from the liquid in separation chamber 50. As noted earlier, separation of protein and liquid in chamber 50 is achieved by fermentation which is carried out under acidic conditions. It is preferred that the acidity in the process be maintained by the anaerobic fermentation process. This adds significantly to the efficiency of the process. For example, it has been found that the time for separation of the protein from liquid in separation chamber 50 can be reduced by as much as 75%. When separation of protein from liquid extracted from grass-based pulp was made using a media which had a substantially neutral pH, the period required for separation was about 24 hours. However, when the protein-free liquid was used in accordance with the invention, the period for separation was about 4 hours. Thus, it will be seen that this improvement alone is a significant advance.

In another embodiment of the invention, the fibrous material from which the protein-containing liquid has been substantially removed can be treated to convert the cellulosic materials contained therein to glucose. That is, in another aspect of the invention the fibrous materials are subjected to hydrolysis with at least one of the materials selected from the group consisting of mineral acids and enzymes to permit increased recovery and purity of glucose therefrom, the increase in recovery based on the weight of material processed during the conversion step being as much as 30% over that obtainable from untreated green crops. Mineral acids which are useful in this respect include sulfuric and hydrochloric acids. Prior to hydrolysis, it is preferred to wash the fibrous material to insure that liquid used in the last washing or scrubbing step (referred to earlier) along with any soluble or suspended material is removed. This washing step is preferred since it acts to increase the purity of the glucose obtained. Water has been found to be suitable as a wash solution. Hydrolysis of the fibrous material, particularly of fibrous material which has been pretreated to remove impurities, produces glucose in greater amounts (25 to 50%) than would be obtained from untreated crops. Typically, up to about 30% more glucose is recovered when the fibrous material is hydrolyzed after the aforesaid treatments than is recovered from untreated green crops. This higher yield of glucose is believed to be attributable to the removal of noncellulosic materials accomplished in the protein separation process. After the glucose has been converted, it can be separated from any remaining fibrous material. Thus, it will be noted that the present invention is advantageous in that it can markedly increase the yield and purity of glucose obtainable from green crops.

In another aspect of the invention, the fibrous material remaining after the protein values have been removed has been found to be beneficial when used or burned with high sulfur coal. That is, high sulfur coal which would be considered undesirable because of sulfur pollution can be used when combined with fibrous material after the protein has been separated therefrom. This fuel mixture has the advantages of both reducing sulfur emissions and producing ash useful as fertilizer. Sulfurous pollutants are reduced because some of the sulfur oxides generated upon combustion of the coal react with the alkaline residues present in the fibrous material to form sulfur salts which are recovered in the ash values. It should be noted that the sulfur emissions are further reduced due to the dilution effect achieved by burning a mixture of coal and organic material as opposed to coal alone. The reduction of sulfur oxide emissions accomplished by burning such a mixture can be effective in reducing emissions from sulfur-containing coals below levels set forth by EPA. An additional benefit obtained by burning such a sulfur coal-fibrous material mixture is the ash values which are suitable for use as fertilizer. It will be understood that generally the ash from coal is not considered suitable for fertilizer and its use therefor is viewed as uneconomical. By comparison, the ash from the coal-fiber material mixture is enriched in potassium and phosphorous to such an extent that it represents a useful product, i.e. fertilizer. In using the fibrous material in this way, it is best to lower the moisture content thereof.

EXAMPLE 1

In this example, 87 grams of fescue grass and about 10 times the amount of water were fed into a heavy-duty blender and pulped for a period of about 3 minutes to provide a protein-rich liquid and fibrous material. Thereafter, the pulp was filtered to separate the protein-rich liquid from the fibrous material. The protein-rich liquid, which was substantially neutral with respect to acidity, was collected and fermented to separate the protein from the liquid. A substantial amount of fermentation was not observed to take place until protein-rich liquid was held for about 24 hours, the fermentation being observable by a coagulation and settling of the protein to the bottom of the container. After the grass was subjected to a pulping action, the pulp contained about 70 wt.% fibrous material (dry basis). The protein-rich liquid from the pulp provided about 30 wt.% protein.

EXAMPLE 2

This example was run as in Example 1 except the solution remaining after the fermentation step was reused for purposes of pulping the grass. After two such runs, it was determined that the pH of solution after fermentation had stabilized and the pH of the solution after fermentation of the second run was 4.5. This solution was added to 68 grams of grass for pulping purposes. The pulp was found to contain 62 wt.% fibrous material and the protein-rich solution contained about 39 wt.% protein. Fermentation was observed to take place after about 4 hours, as evidenced by coagulation and settling of protein to the bottom of the container.

Thus, it can be seen from these examples that initiating fermentation of the protein-rich liquid in an acidic solution significantly reduces the time required to separate the protein from the liquid.

While the invention has been described in terms of preferred embodiments, the claims appended hereto are intended to encompass other embodiments which fall within the spirit of the invention.

What is claimed is:

1. A method of extracting protein from green crops, leaves, grasses, legumes, stems of green plants and tree leaves, comprising the steps of:
   (a) subjecting the green crops, leaves, grasses, legumes, stems of green plants and tree leaves to a hammering action for purposes of rupturing plant cell walls, the hammering taking place in an organic acid solution, having a pH in the range of 3.0 to 5.5 and being recirculated from subsequent fermentation separation step (c) to produce a pulp comprising a protein-rich liquid and fibrous material, the solution being present in amounts sufficient to aid in hammering and maintaining fluidity of the pulp;
   (b) separating protein-rich liquid in the pulp from the fibrous material;
   (c) separating protein from the protein-rich liquid by fermentation using anaerobic naturally occurring microorganisms, the fermentation conducted in an acidic solution thereby providing a concentrated protein fraction suitable for preservation and an acidic solution; and
   (d) recycling at least a portion of the acidic solution to the separation of step (b), the recycling of the solution being provided to insure further removal of protein from the fibrous material.

2. The method in accordance with claim 1 wherein the acidic solution is substantially free of protein and said solution is employed for purposes of washing protein remaining in the fibrous material after said separation step.

3. The method in accordance with claim 1 wherein the acidic solution of step (c) has a pH in the range of 3.0 to 5.5.

4. A method of extracting protein from green crops, leaves, grasses, legumes and stems of green plants, comprising the steps of:
   (a) subjecting green crops, leaves, grasses, legumes, stems of green plants and tree leaves to a hammering action for purposes of rupturing plant cell walls, the hammering taking place in an organic acid solution used in subsequent fermentation step (c), the solution having a pH in the range of 3.0 to 5.5, the pulping action producing a pulp comprising a protein-rich liquid and fibrous material, the solution being present in amounts sufficient to aid in hammering and maintaining fluidity of the pulp;

(b) making an initial separation of protein-rich liquid from the fibrous material;

(c) separating the protein from the protein-rich liquid by fermentation using anaerobic naturally occurring microorganisms, the fermentation conducted in an acidic solution having a pH in the range of about 3.0 to 5.5;

(d) subjecting the fibrous material of step (b), after the initial separation of protein-rich liquid, to a wash treatment to remove protein entrained in said fibrous material, the wash treatment being performed with acidic solution recirculated from step (c); and (e) recirculating acidic solution after said wash treatment to said pulping action to provide an acidic solution therein.

* * * * *